(12) United States Patent
Petros et al.

(10) Patent No.: US 11,548,225 B2
(45) Date of Patent: Jan. 10, 2023

(54) MULTI-CORE INDUCTION EXTRUDER

(71) Applicant: Redworks Construction Technologies, Inc., Lancaster, CA (US)

(72) Inventors: Paul Petros, Reseda, CA (US); Keegan Kirkpatrick, Lancaster, CA (US); Susan Jennings, Palmdale, CA (US)

(73) Assignee: RedWorks Construction Technologies Inc., Palmdale, CA (US)

( * ) Notice: Subject to any disclaimer, the term of this patent is extended or adjusted under 35 U.S.C. 154(b) by 84 days.

(21) Appl. No.: 16/216,958

(22) Filed: Dec. 11, 2018

(65) Prior Publication Data
US 2019/0176400 A1    Jun. 13, 2019

Related U.S. Application Data

(60) Provisional application No. 62/597,555, filed on Dec. 12, 2017.

(51) Int. Cl.
| | |
|---|---|
| *B29C 64/295* | (2017.01) |
| *B29C 35/08* | (2006.01) |
| *B29C 48/15* | (2019.01) |
| *B29C 64/118* | (2017.01) |
| *B33Y 40/00* | (2020.01) |

(Continued)

(52) U.S. Cl.
CPC ........ *B29C 64/295* (2017.08); *B29C 35/0805* (2013.01); *B29C 48/15* (2019.02); *B29C 48/865* (2019.02); *B29C 64/118* (2017.08); *B29C 64/209* (2017.08); *B33Y 10/00* (2014.12); *B33Y 30/00* (2014.12); *B33Y 40/00* (2014.12); *B29C 2035/0816* (2013.01)

(58) Field of Classification Search
CPC ........ B29C 2035/0816; B29C 35/0805; B29C 48/15; B29C 48/865; B29C 64/118; B29C 64/209; B29C 64/295; B33Y 10/00; B33Y 30/00; B33Y 40/00
See application file for complete search history.

(56) References Cited

U.S. PATENT DOCUMENTS

| | | | |
|---|---|---|---|
| 2014/0328964 A1* | 11/2014 | Mark | B29C 64/393 425/166 |
| 2016/0279854 A1* | 9/2016 | Fitzpatrick | B29C 45/74 |

(Continued)

OTHER PUBLICATIONS

O'Neal, Bridget Butler. "Are Induction-Heated Nozzles the Wave of the Future for Greater Speed in 3D Printing?" Mar. 19, 2015, 8 pages, Retrieved from the Internet <URL:https://3dprint.com/52198/induction-heated-nozzles/> [retrieved on Mar. 8, 2019].

(Continued)

*Primary Examiner* — Michael M. Robinson
*Assistant Examiner* — Victoria Bartlett

(57) ABSTRACT

Aspects of the disclosure relate to a method for creating a solidified material using a machine tool. In some aspects, the machine tool supplies a current to an induction coil such that the induction coil generates a magnetic field. The machine tool changes the magnetic field to induce eddy currents in a first conductor surrounding a feedstock and a second conductor surrounded by the feedstock. The machine tool uses the eddy currents to cause the feedstock to transition from a solid state to a uniform malleable state regardless of the feedstock's electrical conductivity.

7 Claims, 6 Drawing Sheets

(51) Int. Cl.
  *B33Y 10/00* (2015.01)
  *B33Y 30/00* (2015.01)
  *B29C 64/209* (2017.01)
  *B29C 48/86* (2019.01)

(56) References Cited

U.S. PATENT DOCUMENTS

2018/0324903 A1* 11/2018 Zeng .................. H05B 6/34
2019/0030602 A1*  1/2019 Sachs ................. B33Y 10/00

OTHER PUBLICATIONS

"DIY 3D Printing, Manufacturing revolution on your destop", retrieved from the internet, http://diy3dprinting.blogspot.com/2015/03/making-induction-heated-extruder.html, published Mar. 17, 2015, 6 pages.

Krassenstein, Brian, "3D Printing Embedded Wires & Fibers for Electronics", retrieved from the internet http://canadamakes.ca/3d-printing-embedded-wires-fibers-for-electronics/, Apr. 1, 2015, 3 pages.

* cited by examiner

MULTI-CORE INDUCTION EXTRUDER

PRIORITY CLAIM

This application claims priority to and the benefit of U.S. Provisional Application No. 62/597,555 filed in the U.S. Patent and Trademark Office on Dec. 12, 2017, the entire content of which is incorporated herein by reference as if fully set forth below in its entirety and for all applicable purposes.

TECHNICAL FIELD

The technology discussed below relates generally to material processing and extruding systems for producing solid objects (e.g., tools, building materials, mechanical parts, etc.). More particularly, the present disclosure relates to an induction heated extruder head for the use of three-dimensional printing non-inductive granular feedstock.

INTRODUCTION

Current additive manufacturing heating elements for Fused Deposition Modeling ("FDM") primarily use direct heat transfer via conductive or radiative heating elements. These heating elements take a substantial amount of energy to make feedstock malleable before being suitable for extrusion and printing. An alternative heating element involves the use of inductive heating, in which electromagnetic induction is used to heat conductive metals through heat generated in the feedstock by eddy currents. However, this process is problematic for non-metallic materials and silicas, which are non-conductive.

There have been attempts to create induction heating systems for FDM three-dimensional ("3D") printers, the goal being to reduce the time and energy required to heat feedstock to a malleable state. However, existing induction heating systems can only heat conductive materials and are not practical for a wider range of 3D printing feedstocks. There have been some attempts to resolve this by heating the outer wall of the print head with induction heating, thereby indirectly heating non-conductive feedstock. These processes, however, have only been used at the low temperatures required for typical FDM three-dimensional printing feedstocks (100-260 degrees Celsius). They are also less effective with larger extrusion diameters, as only heating the outer wall leads to the material near the center of the extruder remaining colder, and thus less malleable than the material near the walls. This non-uniform heating can lead to impurities and structural weaknesses in the finished part. Furthermore, embedded secondary structural support has been applied to the process of FDM three-dimensional printing, though such a process has only been achieved by a secondary filament extruder. This process is time consuming and subject to misalignment.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In accordance with some aspects of the disclosure, a method for creating a solidified material using a machine tool is provided. The machine tool supplies a current to an induction coil such that the induction coil generates a magnetic field. The machine tool changes the magnetic field to induce eddy currents in a first conductor surrounding a feedstock and a second conductor surrounded by the feedstock. The machine tool uses the eddy currents to cause the feedstock to transition from a solid state to a uniform malleable state regardless of the feedstock's electrical conductivity.

In accordance with some aspects of the disclosure, a method for a machine tool is provided. The machine tool supplies a current to an induction coil disposed around a conductive crucible to generate a magnetic field. The machine tool changes the magnetic field to generate heat in the conductive crucible and an induction support core situated in the conductive crucible, at least a portion of the induction support core being surrounded by the feedstock. The machine tool heats the feedstock into a malleable state using the heat from the conductive crucible and the induction support core.

In accordance with some aspects of the disclosure, an apparatus is provided. The apparatus includes a conductive crucible configured to receive a feedstock. The apparatus further includes an induction support core. At least a portion of the induction support core is situated in the conductive crucible and surrounded by the feedstock. The apparatus further includes an induction coil configured to generate a changing magnetic field. The changing magnetic field enables the conductive crucible and the induction support core to heat the feedstock into a malleable state.

BRIEF DESCRIPTION OF THE DRAWINGS

The present solution will be described with reference to the following drawing figures, in which like numerals represent like items throughout the figures.

DETAILED DESCRIPTION

Figure 1:
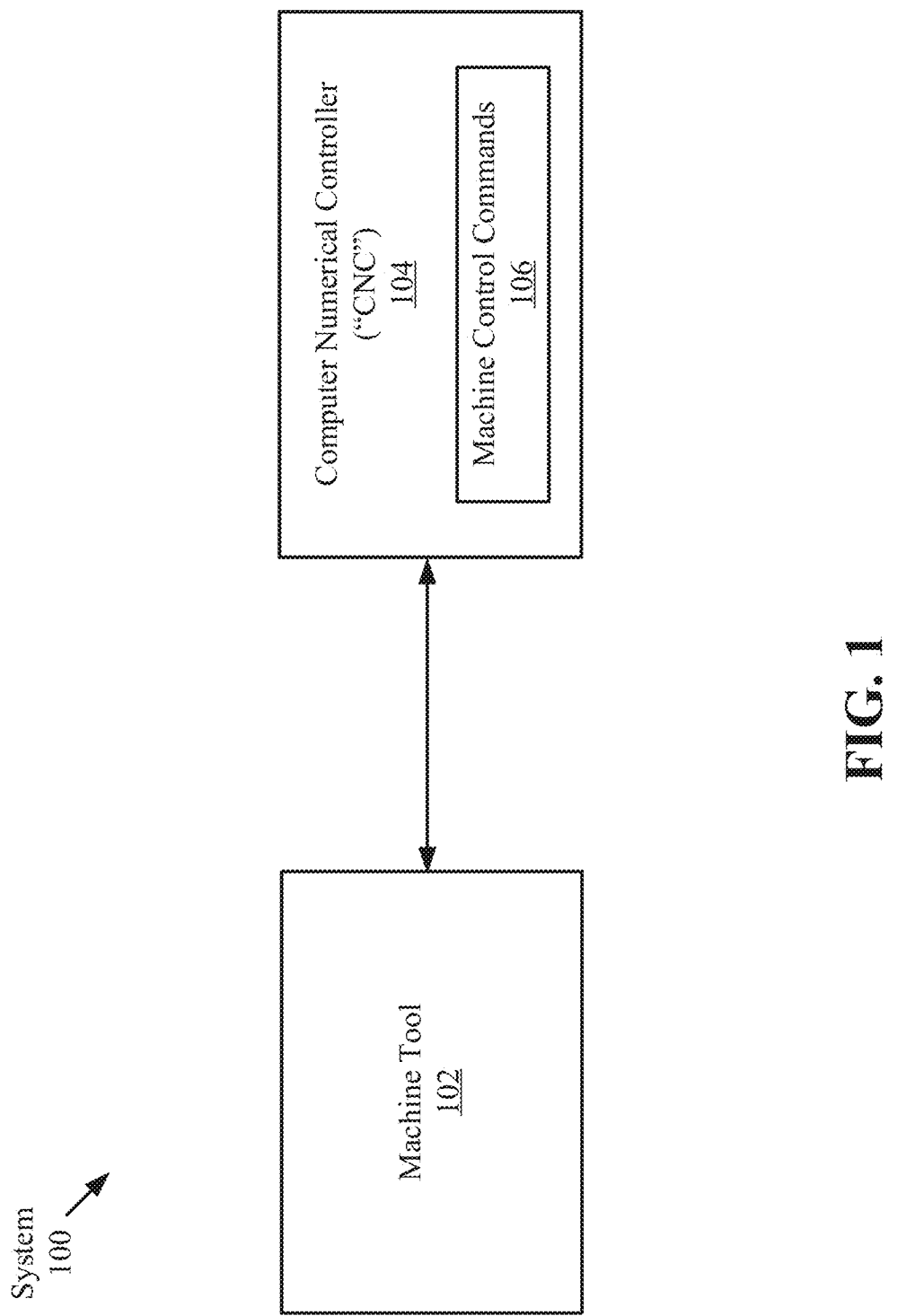
FIG. 1 is an illustration of an illustrative architecture for a system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Because of the limitations of the conventional solutions (such as those described above in the introduction section of this document), induction sintering of 3D printing feedstock has never been used as a means for producing parts for large area additive manufacturing. Manufacturers have continued to rely on slower and less efficient parts production techniques. Accordingly, there exists a need for an apparatus for turning non-inductive material into a malleable state to be extruded into useful, large volume objects. Moreover, the apparatus may need to efficiently heat the whole volume of the feedstock to conserve energy and ensure reliable parts are being made.

The present solution generally concerns an induction heated extruder head for the use of 3D printing non-inductive granular feedstock. The first objective of the present solution is to take feedstock (e.g., granular feedstock) and convert it into a malleable state, regardless of the electrical conductivity of the feedstock. The second objective is to extrude the material (e.g., the feedstock in a malleable state) and deposit or form it into useful solid objects. The present solution employs induction heating to render feedstock (e.g., granular feedstock) to a uniform malleable state. The feedstock is pushed into a crucible using mechanical back pressure generated by a screw auger. The crucible consists of two electrically and thermally conductive elements that convert electromagnetic energy to heat energy. These elements, an outer "shell" and an inner "core" both transfer heat into the feedstock, uniformly heating it to a malleable state. This fused state material is then pushed (or extruded) out an orifice (e.g., a nozzle) along with the core, which acts as internal structural support to the printed part. This whole assembly may be attached to a CNC.

Referring now to FIG. 1, there is provided an illustration of an illustrative system 100. System 100 comprises a machine tool 102 and a CNC 104. CNCs are well known in the art, and therefore will not be described in detail herein. It should be understood that the CNC 104 is generally configured to facilitate automation of the machine tool 102. In this regard, the CNC 104 executes pre-programmed sequences of machine control commands 106 for causing the machine tool 102 to produce a part. The machine control commands are generated by: defining a part's mechanical dimensions using Computer-Aided Design ("CAD") software; translating the part's mechanical dimensions into manufacturing directives using Computer-Aided Manufacturing ("CAM") software; and transforming the manufacturing directives into the machine control commands for producing the part such that it closely matches the CAD design.

Figure 2:
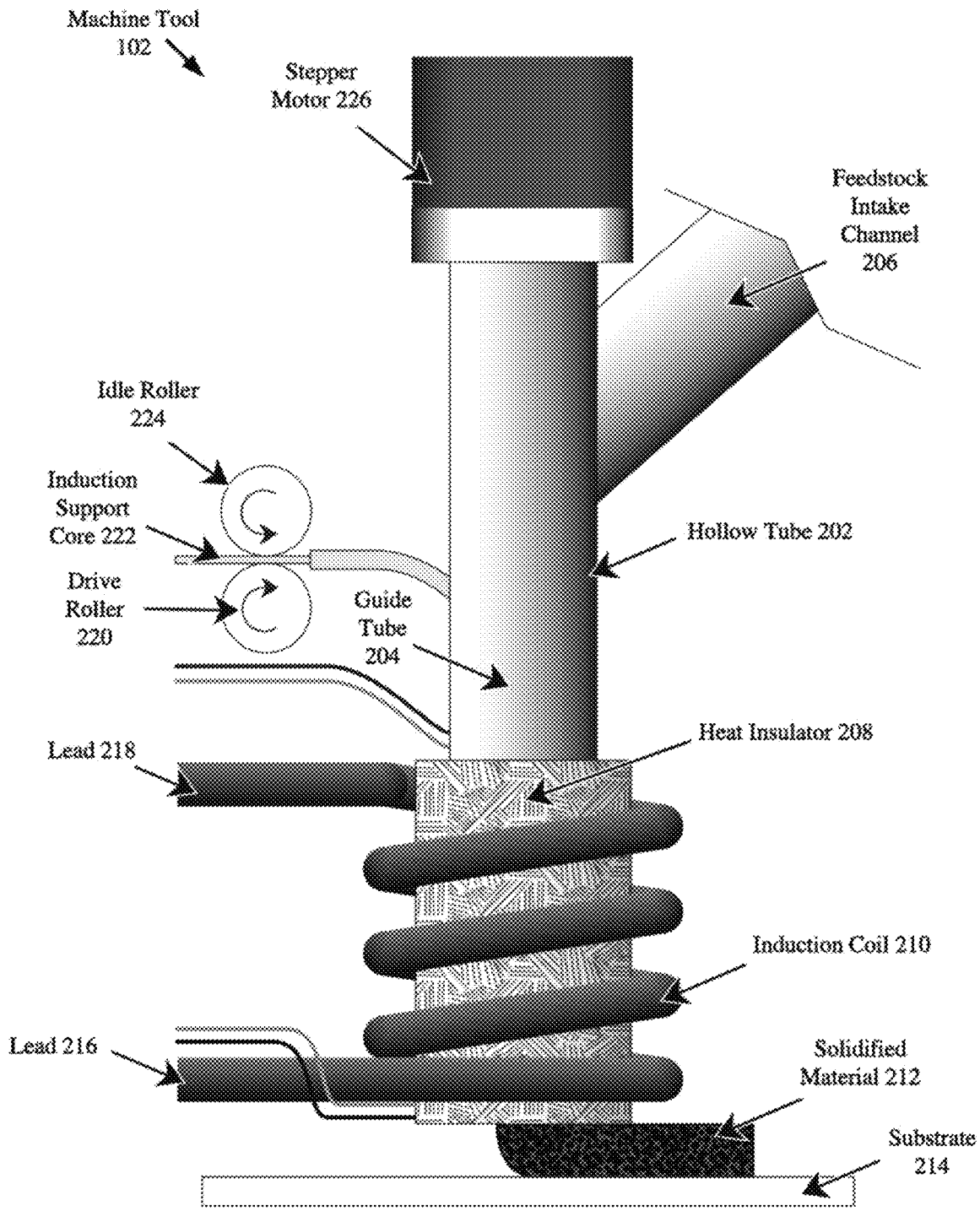
FIG. 2 is an illustration of an illustrative architecture for the machine tool shown in FIG. 1.
Figure 3:
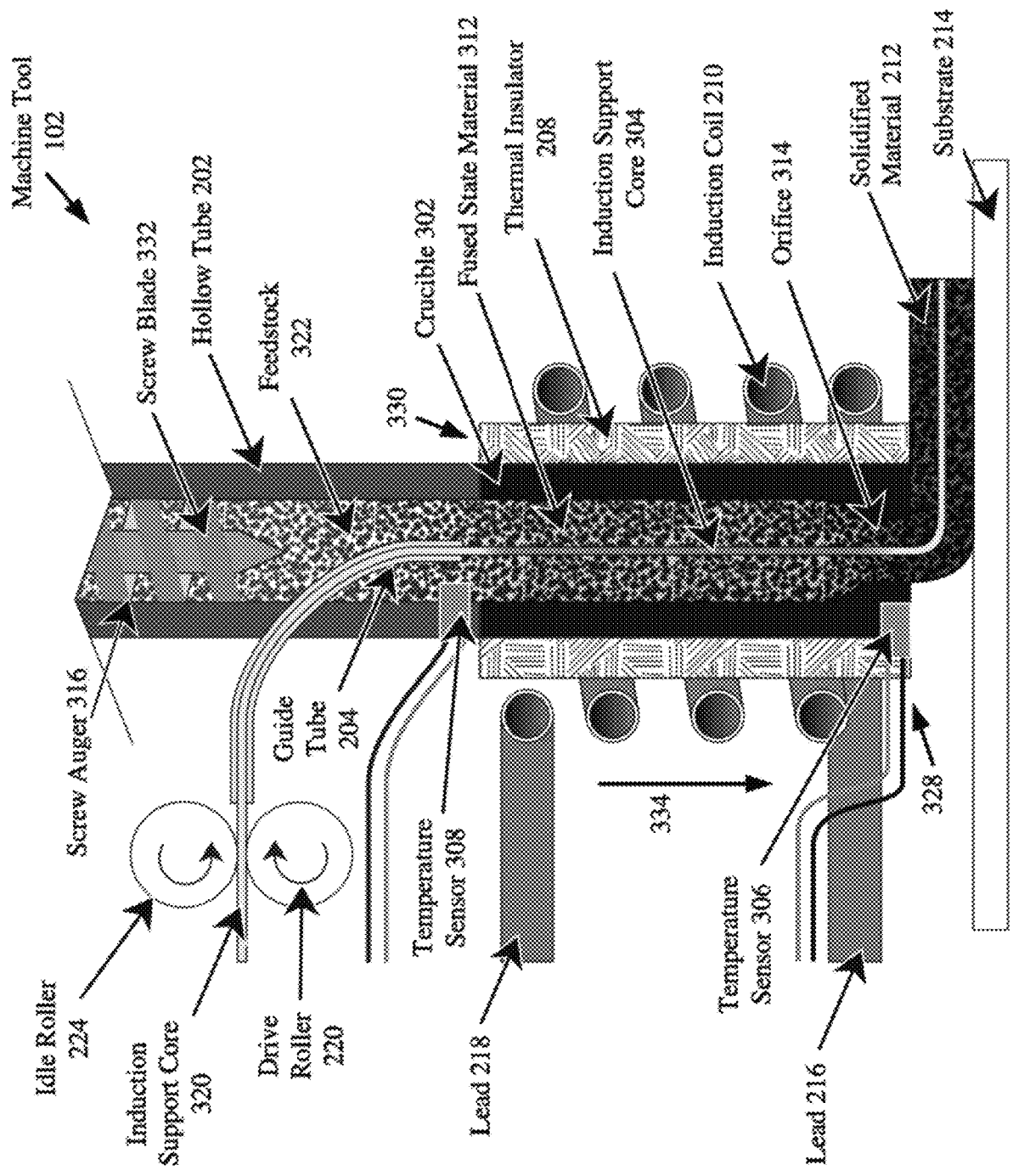
FIG. 3 is an illustration of an illustrative architecture for the machine tool shown in FIG. 1.

Referring now to FIGS. 2 and 3, there are provided illustrations of an illustrative architecture for the machine tool 102 shown in FIG. 1. The machine tool 102 comprises a crucible 302 (also referred to as a conductive crucible) made of inductive material surrounded by a thermal insulator 208. An induction coil 210 is disposed on the thermal insulator 208. The thermal insulator 208 does not allow heat to pass between the induction coil 210 and the crucible 302. In some scenarios, the induction coil 210 is formed of copper, and the thermal insulator 208 is formed of aluminum fire brick. The present solution is not limited in this regard.

The induction coil 210 is provided to generate a magnetic field when a direct current is supplied thereto. In this regard, the induction coil 210 consists of a conductive wire wound around the thermal insulator 208. A first end portion of the wire defines a first lead 216 which extends out and away from a first end 328 of the crucible 302. A second end portion of the wire defines a second lead 218 which extends out and away from a second end 330 of the crucible 302. The first and second leads 216, 218 are connected to a current source (not shown). Current sources are well known in the art and, therefore, will not be described herein for the sake of brevity. Any known or to be known current source can be used herein without limitation. When current passes through the induction coil 210, the magnetic field is generated inside the induction coil 210 in a direction 334. An eddy current is induced in the crucible 302 by changing the magnetic field in the induction coil 210. The eddy current flows in direction 334 through the crucible 302. The crucible 302 is heated by the eddy current induced therein.

Although the induction coil 210 is shown as having four winds (e.g., four loops or turns) around the thermal insulator 208, the present solution is not limited in this regard. Any number of induction coil winds can be implemented herein in accordance with a particular application. Notably, the more turns with which the wire is wound around the thermal insulator 208, the stronger the magnetic field that is generated.

A hollow tube 202 is provided linearly adjacent to the second end 330 of the crucible 302 to allow feedstock 322 to be guided into the crucible 302. The feedstock 322 is provided to the hollow tube 202 via a feedstock intake channel 206. The hollow tube 202 houses a screw auger 316 and a guide tube 204 for an induction support core 320. In some scenarios, the screw auger 316 comprises an IRWIN 1-in Woodboring Ship Auger Bit Drill Bit having model number 1779345. In some examples, the hollow tube 202 and induction support core 320 may be formed of copper. In some examples, the crucible 302 may include a graphite 10 oz R9 R9D-10-Kwik Kiln Graphite Furnace Crucible. It should be understood that the present solution is not limited in this regard.

The screw auger 316, guide tube 204 and induction support core 320 are surrounded by the feedstock 322 taken into the hollow tube 202 and the crucible 302. The feedstock 322 may be in a granular form. An orifice 314 is provided at the first end 328 of the crucible 302 to allow the feedstock 322 to pass out of the crucible 302 after being heated by the crucible 302 and the induction support core 320. Similar to the crucible 302, the induction support core 320 is heated by the eddy current induced therein by changing the magnetic field generated by the induction coil 210. The heated feedstock is referred to herein as a fused state material 312. After passing out of the orifice 314, the fused state material 312 is deposited on a substrate 214 and solidifies so as to become a solidified material 212.

A stepper motor 226 is attached to the screw auger 316. Stepper motors are well known in the art, and therefore will not be described in detail here. Any known or to be known stepper motor can be used herein without limitation. For example, the stepper motor 226 may be a Commercial Off The Shelf ("COTS") Nema 23 stepper motor having part number 23HM20-0384D. It should be understood that the present solution is not limited to the particulars of this example. The stepper motor 226 generally comprises a Direct Current ("DC") motor that moves in discrete steps. For example, the stepper motor 226 rotates one step at a time as controlled by the CNC 104 of FIG. 1. The rotational movement of the stepper motor 226 causes a screw blade 332 of the screw auger 316 to rotate, whereby the feedstock 322 is moved out of the hollow tube 202 and into the crucible 302. The present solution is not limited to the particulars of this example.

A drive roller 220 and an idle roller 224 are provided external to the hollow tube 202. The rollers 220, 224 reside on opposing sides of the induction support core 320 so as to be in direct contact therewith. The rollers 220, 224 are provided to control the rate of insertion of the induction support core 320 into the guide tube 204. For example, operations of the rollers 220, 224 may be controlled by the CNC 104 of FIG. 1.

Two temperature sensors 306, 308 are provided to measure and track the temperatures at the first and second ends 328, 330 of the crucible 302. The temperature measured at the second end 330 of the crucible 302 is referred to herein as a pre-process temperature. The temperature measured at the first end 328 of the crucible 302 is referred to herein as a post-process temperature. These temperature sensors 306, 308 reside at locations just outside the limits of an electromagnetic range.

During operation, the feedstock 322 is piped into the hollow tube 202 from the feedstock intake channel 206. In the hollow tube 202, the feedstock 322 meets the screw auger 316, which is precisely turned by the stepper motor 226. The screw auger 316 forces the feedstock 322 into the crucible 302 and around the induction support core 304.

The induction support core 304 is forced between the drive roller 220 and the idle roller 224. The drive roller 220 controls the feed rate of the induction support core 304 as it enters through the guide tube 204 and into the crucible 302.

The crucible 302 and the induction support core 304 (which are both made from an inductive material) are heated by electromagnetic eddy currents emitted by the induction coil 210. For efficiency and protection of the induction coil 210 from high heat, a thermal insulator 208 is placed between the crucible 302 and the induction coil 210. The induction support core 304 and the crucible 302 heat the feedstock 322 such that it becomes a fused state material 312. The back pressure generated from the screw auger 316 continues to build forcing the fused state material 312 through the orifice 314 along with the induction support core 304. The rate at which the fused state material 312 and the induction support core 304 leave the orifice 314 are in relation to each other.

The temperature sensor 308 measures the pre-process temperature as the feedstock 322 moves into the crucible 302 while the temperature sensor 306 measures the post-process temperature as the fused state material 312 and the induction support core 304 leave the crucible 302. Both temperature sensors 306, 308 help regulate the power to the induction coil 210. In turn, the temperature of the fused state material 312 is regulated while in the crucible 302. The fused state material 312 and the induction support core 304 cool to become solidified material 212 as it is deposited to the substrate 214.

The present solution is not limited to the particular architecture shown in FIGS. 2 and 3. For example, the screw auger 316 can be replaced with a peristaltic pump, hydraulics, and other mechanical and non-mechanical pressure systems. Additionally, the induction support core 304 may or may not extrude with the fused state material 312, and can be built-in as a fixed component. The induction support core 304 may also include multiple cores and/or vary in size from a narrow filament to a fixed cylinder.

Figure 4:
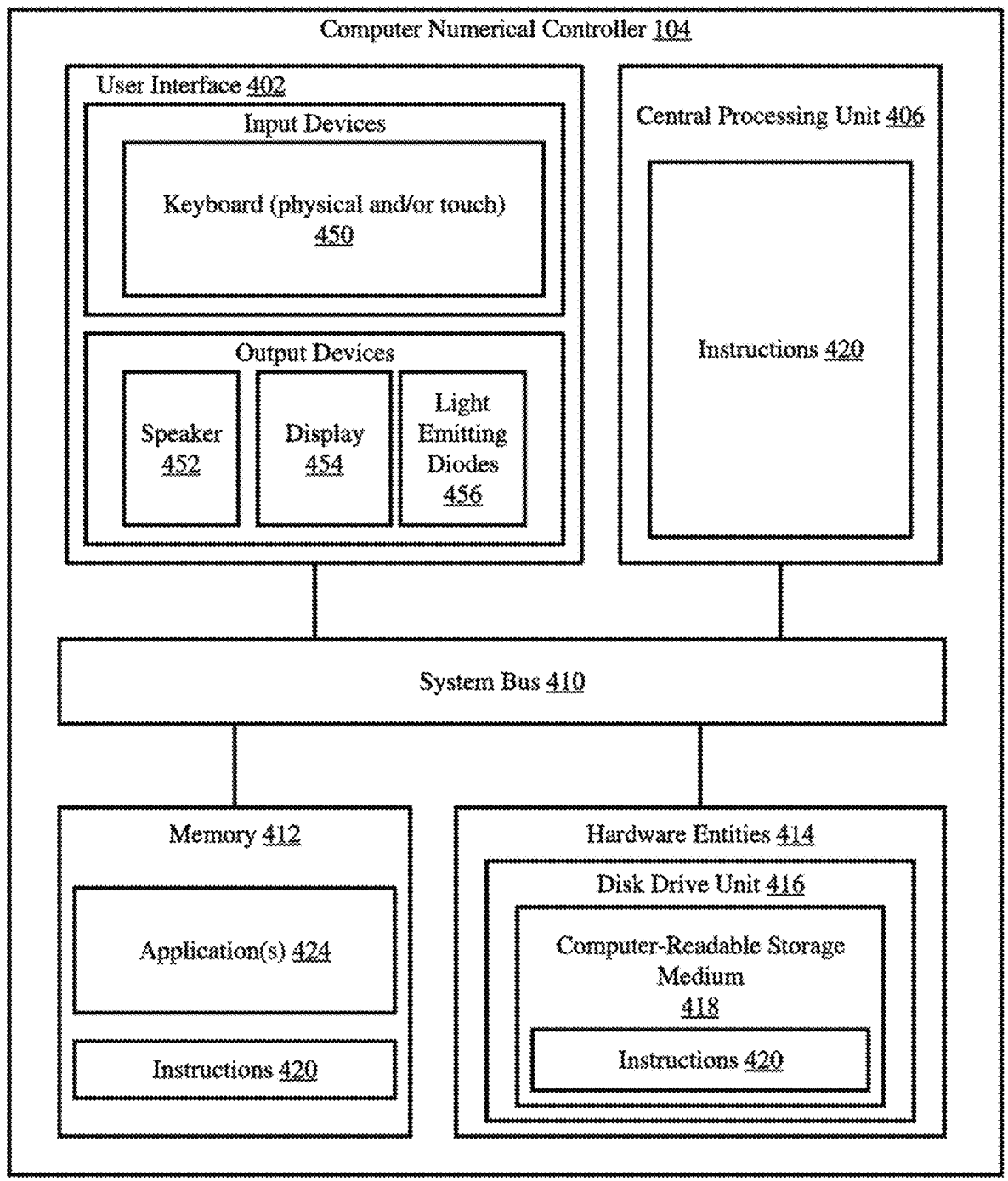
FIG. 4 is an illustration of an illustrative architecture for a Computer Numerical Controller ("CNC").

Referring now to FIG. 4, there is provided an illustration of an exemplary architecture for the CNC 104 of FIG. 1. CNCs are well known in the art. Any known or to be known CNC can be used herein without limitation. The CNC 104 is generally configured to facilitate automation of machine tools (e.g., machine tool 102 of FIG. 1). In this regard, the CNC 104 executes pre-programmed sequences of machine control commands. The machine control commands are generated by: defining a part's mechanical dimensions using Computer-Aided Design ("CAD") software; translating the part's mechanical dimensions into manufacturing directives using Computer-Aided Manufacturing ("CAM") software; and transforming the manufacturing directives into the machine control commands for producing the part such that it closely matches the CAD design.

CNC 104 may include more or less components than those shown in FIG. 4. However, the components shown are sufficient to disclose an illustrative solution implementing the present solution. The hardware architecture of FIG. 4 represents one implementation of a representative computing device configured to control an induction heated extruder head for the use of 3D printing non-inductive granular feedstock, as described herein. As such, the CNC 104 of FIG. 4 implements at least a portion of the method(s) described herein.

Some or all the components of the CNC 104 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the CNC 104 comprises a user interface 402, a Central Processing Unit ("CPU") 406, a system bus 410, a memory 412 connected to and accessible by other portions of CNC 104 through system bus 410, and hardware entities 414 connected to system bus 410. The user interface can include input devices and output devices, which facilitate user-software interactions for controlling operations of the CNC 104. The input devices include, but are not limited, a physical and/or touch keyboard 450. The input devices can be connected to the CNC 104 via a wired or wireless connection (e.g., a Bluetooth® connection). The output devices include, but are not limited to, a speaker 452, a display 454, and/or light emitting diodes 456.

At least some of the hardware entities 414 perform actions involving access to and use of memory 412, which can be a Radom Access Memory ("RAM"), a disk driver and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the CNC 104. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the CNC 104 and that cause the CNC 104 to perform any one or more of the methodologies of the present disclosure.

Figure 5:
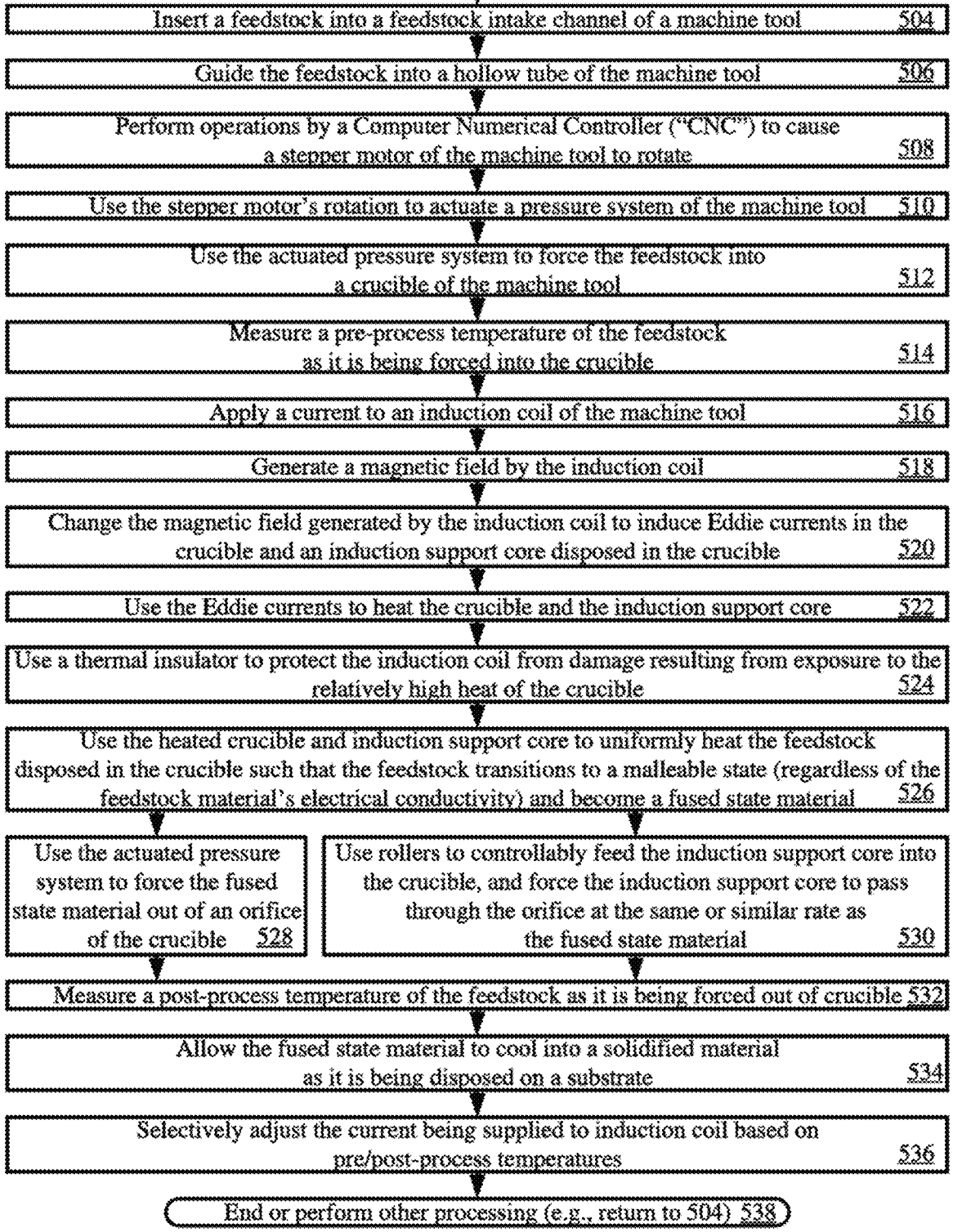
FIG. 5 is a flow diagram of an illustrative method for operating a machine tool.

Referring now to FIG. 5, there is provided a flow diagram of an illustrative method 500 for operating a machine tool (e.g., machine tool 102 of FIGS. 1-3). Method 500 begins at block 502 and continues with block 504 where a feedstock (e.g., feedstock 322 of FIG. 3) is inserted into a feedstock intake channel (e.g., feedstock intake channel 206 of FIG. 1) of a machine tool. At block 506, the feedstock is guided into a hollow tube (e.g., hollow tube 202 of the machine tool).

Subsequently, at block 508, a CNC (e.g., CNC 104 of FIG. 1) performs operations to cause a stepper motor (e.g., stepper motor 226 of FIG. 2) of the machine tool to rotate. The stepper motors rotation is used at block 510 to actuate a pressure system (e.g., a screw auger 316 of FIG. 3) of the machine tool. At block 512, the actuated pressure system is used to force the feedstock into a crucible (e.g., crucible 302 of FIG. 3) of the machine tool. At this time, a preprocess temperature is measured as shown at block 514.

At block 516, a current is applied to an induction coil of the machine tool. Consequently, the inductive coil generates a magnetic field, as shown at block 518. At block 520, the magnetic field is changed to induce eddy currents in the crucible and an induction support core (e.g., induction support core 304 of FIG. 3) of the machine tool. The eddy currents are used at block 522 to heat the crucible and the induction support core. Notably, a thermal insulator is used to protect the induction coil from damage resulting from exposure to the relatively high heat of the crucible, as shown at block 524. At block 526, the heated crucible and induction support core are used to uniformly heat the feedstock disposed in the crucible such that the feedstock transitions to a malleable state (regardless of the feedstock material's electrical conductivity) and becomes a fused state material (e.g., fused state material 312 of FIG. 3). Subsequently, blocks 528 and 530 are performed concurrently. Blocks 528 and 530 involve: using the actuated pressure system to force the fused state material out of an orifice (e.g., orifice 314 of FIG. 3) of the crucible; and using rollers (e.g., rollers 220, 224 of FIG. 2) to controllably feed the induction support core into the crucible. The induction support core passes through the orifice at the same or similar rate as the fused state material. At block 532, a post-process temperature of the feedstock is measured as the feedstock is being forced out of the crucible.

At block 534, the fused state material is allowed to cool into a solidified material (e.g., solidified material 212 of FIG. 2) as it is being disposed on a substrate (e.g., substrate 214 of FIG. 2). At block 536, the current being applied to the induction coil is selectively adjusted based on the pre-process temperature and the post-process temperature. Subsequently, block 538 is performed where method 500 ends or other processing is performed (e.g., return to 504).

Figure 6:
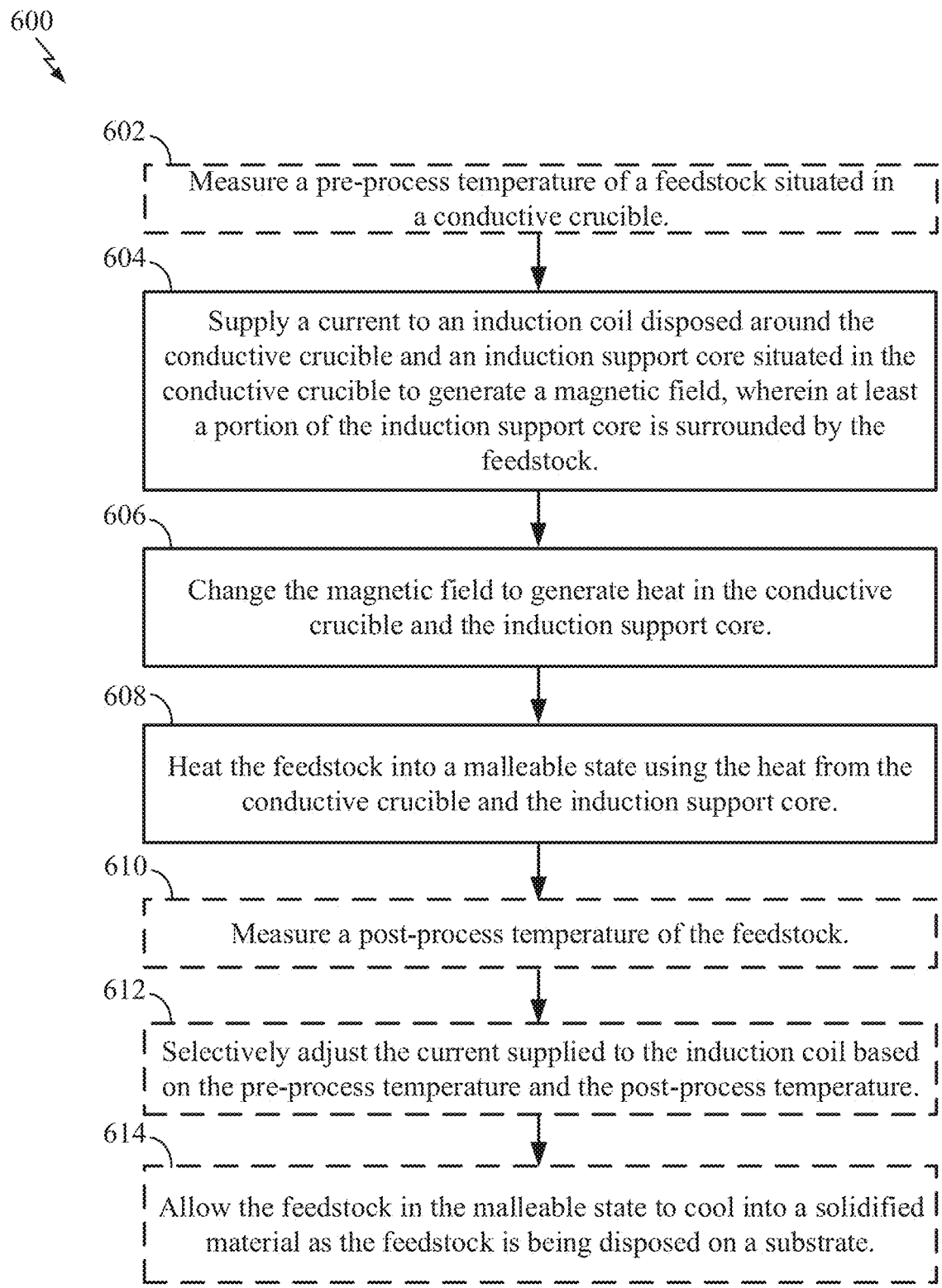
FIG. 6 is a flow diagram of an illustrative method that may be performed by a machine tool.

Referring now to FIG. 6, there is provided a flow diagram of an illustrative method 600. The method 600 may be performed by a machine tool (e.g., machine tool 102 of FIGS. 1-3). It should be understood that the blocks represented with dashed lines in FIG. 6 represent optional blocks.

At block 602, the machine tool may measure a pre-process temperature of a feedstock situated in a conductive crucible. At block 604, the machine tool may supply a current to an induction coil disposed around the conductive crucible and an induction support core situated in the conductive crucible to generate a magnetic field, wherein at least a portion of the induction support core is surrounded by the feedstock. At block 606, the machine tool may change the magnetic field to generate heat in the conductive crucible and the induction support core. At block 608, the machine tool may heat the feedstock into a malleable state using the heat from the conductive crucible and the induction support core. At block 610, the machine tool may measure a post-process temperature of the feedstock. At block 612, the machine tool may selectively adjust the current supplied to the induction coil based on the pre-process temperature and the post-process temperature. At block 614, the machine tool may allow the feedstock in the malleable state to cool into a solidified material as the feedstock is being disposed on a substrate.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for creating a solidified material using a machine tool, comprising:
    moving a feedstock having a granular form into a first conductor and around a second conductor situated in the first conductor, wherein the feedstock is a conductive material, wherein the first conductor surrounds the feedstock, and wherein the second conductor is surrounded by the feedstock;
    supplying a current to an induction coil to generate a magnetic field;
    changing the magnetic field to induce eddy currents in the first conductor and the second conductor; and
    using the eddy currents to cause the feedstock to transition from a solid state to a uniform malleable state regardless of the feedstock's electrical conductivity,
    wherein the first conductor comprises an orifice for extrusion of the feedstock in the uniform malleable state, and wherein the second conductor is a fixed component that is not extruded from the orifice with the feedstock in the uniform malleable state.

2. The method according to claim 1, wherein the first conductor comprises a crucible of the machine tool.

3. The method according to claim 1, wherein the second conductor comprises an induction support core.

4. The method according to claim 1, further comprising:
    measuring a pre-process temperature of the feedstock and a post-process temperature of the feedstock.

5. The method according to claim 4, further comprising selectively adjusting the current supplied to the induction coil based on the pre-process temperature and the post-process temperature.

6. The method according to claim 1, further comprising allowing the feedstock in the uniform malleable state to cool into a solidified material as the feedstock is being disposed on a substrate.

7. A method for creating a solidified material using a machine tool, comprising:
    moving a feedstock having a granular form into a conductive crucible and around an induction support core situated in the conductive crucible, wherein the feedstock is a conductive material, wherein the conductive crucible surrounds the feedstock, and wherein the induction support core is surrounded by the feedstock;
    supplying a current to an induction coil to generate a magnetic field;
    changing the magnetic field to induce eddy currents in the conductive crucible and the induction support core; and
    using the eddy currents to cause the feedstock to transition from a solid state to a uniform malleable state regardless of the feedstock's electrical conductivity,
    wherein the conductive crucible comprises an orifice for extrusion of the feedstock in the uniform malleable state, and wherein the induction support core is a fixed component that is not extruded from the orifice with the feedstock in the uniform malleable state.

* * * * *